United States Patent [19]
Morikawa et al.

[11] Patent Number: 6,147,637
[45] Date of Patent: Nov. 14, 2000

[54] OBSTACLE DETECTING SYSTEM FOR AUTOMOTIVE VEHICLE

[75] Inventors: Katsuhiro Morikawa, Nagoya; Tetsuya Nakamura, Chiryu, both of Japan

[73] Assignee: DENSO Corporation, Kariya, Japan

[21] Appl. No.: 09/120,840

[22] Filed: Jul. 23, 1998

[30] Foreign Application Priority Data

Jul. 23, 1997 [JP] Japan ................................. 9-197368
May 27, 1998 [JP] Japan ................................ 10-146092

[51] Int. Cl.[7] ............................ G01S 13/93; G01S 17/93
[52] U.S. Cl. ............................. 342/70; 342/52; 342/54; 342/69; 342/89; 342/91; 342/118; 342/127; 342/165; 342/167; 342/195; 356/27; 356/28
[58] Field of Search ............................. 342/23, 27, 28, 342/29, 41, 52–54, 61, 63, 69–72, 89, 94, 118, 127, 133, 134, 135, 136, 146, 147, 165, 167–174, 195, 92; 340/435; 356/27, 28

[56] References Cited

U.S. PATENT DOCUMENTS

| | | |
|---|---|---|
| 4,950,075 | 8/1990 | Ichinose et al. . |
| 5,235,315 | 8/1993 | Cherry et al. ......................... 340/435 |
| 5,485,155 | 1/1996 | Hibino . |
| 5,574,463 | 11/1996 | Shirai et al. . |
| 5,627,511 | 5/1997 | Takagi et al. . |
| 5,631,639 | 5/1997 | Hibino et al. . |
| 5,684,473 | 11/1997 | Hibino et al. . |
| 5,710,565 | 1/1998 | Shirai et al. . |

FOREIGN PATENT DOCUMENTS 1-280272 11/1989 Japan .
6-75048 3/1994 Japan .

Primary Examiner—Bernarr E. Gregory
Attorney, Agent, or Firm—Pillsbury Madison & Sutro LLP

[57] ABSTRACT

An automotive obstacle detecting system is provided which includes a radar to measure the distance to a target present within a detectable zone. The system monitors a distance limit measurable by the radar and determines a reduction in ability to measure the distance to the target by comparing the distance limit with a given reference value.

10 Claims, 11 Drawing Sheets

OBSTACLE DETECTING SYSTEM FOR AUTOMOTIVE VEHICLE

BACKGROUND OF THE INVENTION

1. Technical Field of the Invention

The present invention relates generally to an obstacle detecting system for use in traveling control of automotive vehicles, and more particularly, to an obstacle detecting system capable of monitoring a system malfunction.

2. Background of Related Art

Automotive obstacle detecting systems that are known in the art have a radar designed to transmit radar waves such as light waves and milimetric waves and receive a signal reflected from a detectable zone to acquire an object that lies ahead of the vehicle. In such systems, a collision alarm apparatus is used to measure a distance to an obstacle such as a preceding vehicle, to issue an alarm and to adjust a cruise control apparatus which controls the speed of the vehicle and maintains a distance between the vehicles. These apparatuses, however, are limited due to the lack of performance of the radar due to rain, snow, ice, and/or mud deposits. Because the snow or rain also reflects a beam radiated from the radar, the system may erroneously recognize an obstacle. In order to avoid these deficiencies, a self-diagnostic system has been sought which is designed to diagnose or monitor a malfunction of the radar and error in detecting obstacles.

SUMMARY OF THE INVENTION

It is therefore a principal object of the present invention to avoid the disadvantages of the previous systems.

It is another object of the present invention to provide an automotive obstacle detecting system capable of monitoring a change in performance thereof.

One embodiment of the present invention describes an automotive obstacle detecting system which comprise a radar unit that transmits radar signals around a system vehicle equipped with this system and receives a signal produced by reflection of at least one of the transmitted radar signals from an obstacle present in an obstacle detectable zone, a distance determining means for determining a distance to the obstacle based on the signal received by the radar unit, a distance limit determining means for determining a distance limit measurable by the distance measuring means and a system ability determining means for determining a change in ability to measure the distance to the obstacle by comparing the distance limit determined by the distance limit determining means with a given reference value.

In a mode of the invention, the system ability determining means determines a decreased ability to measure the distance to the obstacle when the distance limit is smaller than the given reference value.

When the system vehicle is approaching the obstacle which is a preceding vehicle, the distance limit determining means determines the distance limit as the distance to the preceding vehicle determined by the distance determining means immediately when the preceding vehicle has entered the obstacle detectable zone.

When the system vehicle is moving away from the obstacle which is the preceding vehicle, the distance limit determining means determines the distance limit as the distance to the preceding vehicle determined by the distance determining means immediately when the preceding vehicle has reached a limit of the obstacle detectable zone.

When no preceding vehicle is traveling ahead of the system vehicle, the distance limit determining means determines the distance limit as the distance to a roadside obstacle determined by the distance determining means immediately when the roadside obstacle has entered the obstacle detectable zone.

The system ability determining means determines the change in ability to measure the distance to the obstacle when the system vehicle is traveling straight.

The system ability determining means determines the change in ability to measure the distance to the obstacle when the system vehicle is traveling at a speed greater than a given value.

The system ability determining means determines the change in ability to measure the distance to the obstacle when a relative speed of the system vehicle to a preceding vehicle acquired by the radar unit as the obstacle is greater than a preselected value.

The system ability determining means determines the change in ability to measure the distance to the obstacle when the obstacle has not entered a dead angle behind another obstacle before a preselected period of time.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
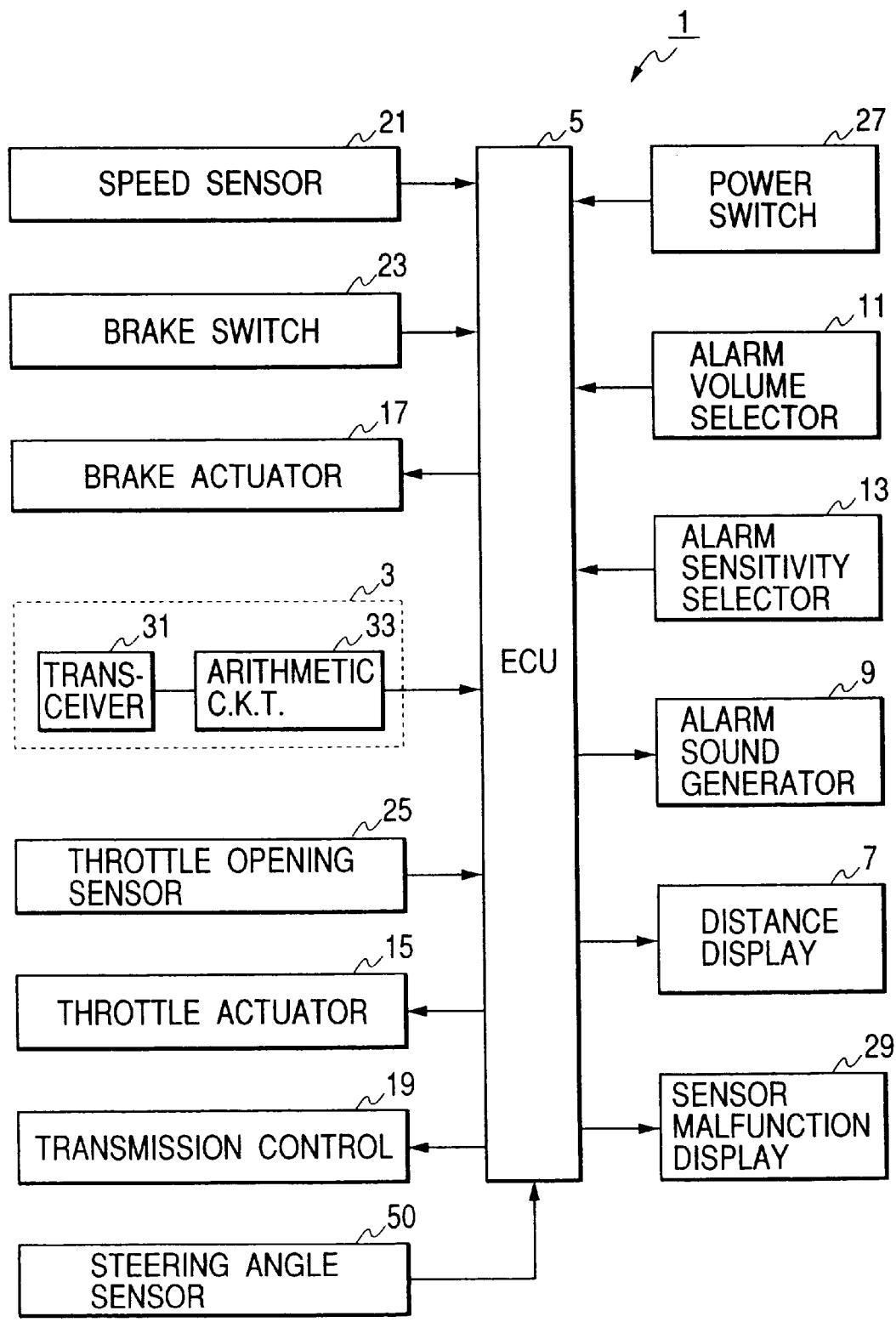
FIG. 1 is a block diagram which shows an automotive obstacle detecting system of the invention.

FIG. 1 shows an automotive obstacle detecting system 1 having a self-diagnostic function according to the present invention. The self-diagnostic function monitors a decrease in performance of the obstacle detecting system 1 and outputs an error in recognition of an obstacle present in front of a vehicle equipped with the obstacle detecting system 1 (hereinafter, referred to as a system vehicle).

The obstacle detecting system 1 tracks a preceding vehicle in response to a mode selection signal. In collision alarm mode, the obstacle detecting system 1 outputs an alarm to inform a vehicle operator of the possibility of collision when a distance between the preceding vehicle and the system vehicle reaches a warning distance. In a cruise mode, the speed of the system vehicle is controlled so as to follow the tracked preceding vehicle at a constant intervehicle distance.

The obstacle detecting system 1 includes an electronic control unit 5, a speed sensor 21, a brake switch 23, a brake actuator 17, a distance/azimuth measuring scanner 3, a throttle opening sensor 25, a throttle actuator 15, an automatic transmission control unit 19, a steering angle sensor 50, a power switch 27, an alarm volume selector 11, an alarm sensitivity selector 13, an alarm sound generator 9, a distance display 7, and a sensor malfunction display 29.

The electronic control unit 5 has a microcomputer, an input/output interface circuit, driving circuits, and detection circuits which can be of any known arrangements, and explanation thereof in detail will be omitted here.

The distance/azimuth measuring scanner 3 acquires an object to provide a signal indicative of the distance to and angular direction of the object to the control unit 5. The control unit 5 determines the type of the object, as will be described later in detail, and provides a distance signal to the distance display 7 to indicate the distance to the object when determined as a preceding vehicle.

The alarm sound generator 9 is activated when the preceding vehicle enters the warning distance to inform the vehicle operator of the possibility of collision. The alarm volume selector 11 is designed to manually adjust the volume on the alarm sound generator 19. The alarm sensitivity selector 13 is designed to adjust the sensitivity of determining of whether an alarm is to be raised or not. The power switch 27 is designed to be turned on manually or in response to activating an ignition switch to supply the power to the control unit 5.

The control unit 5, in the cruise mode, monitors the speed of the system vehicle measured by the speed sensor 21, a brake pedal effort detected by the brake switch 23, and an opening degree of a throttle valve sensed by the throttle opening sensor 25 and provides control signal to the brake actuator 17, the throttle actuator 15, and the automatic transmission control unit 19 to regulate the speed of the system vehicle according to the status of the tracked preceding vehicle.

The control unit 5 also monitors operations of the sensor 21, the brake switch 23, the throttle opening sensor 25, and the distance/azimuth measuring scanner 3 and provides a malfunction signal to the sensor malfunction display 29 when a malfunction occurs.

The distance/azimuth measuring scanner 3 is implemented with a radar unit which includes a transceiver 31 and an arithmetic circuit 33.

Figure 2:
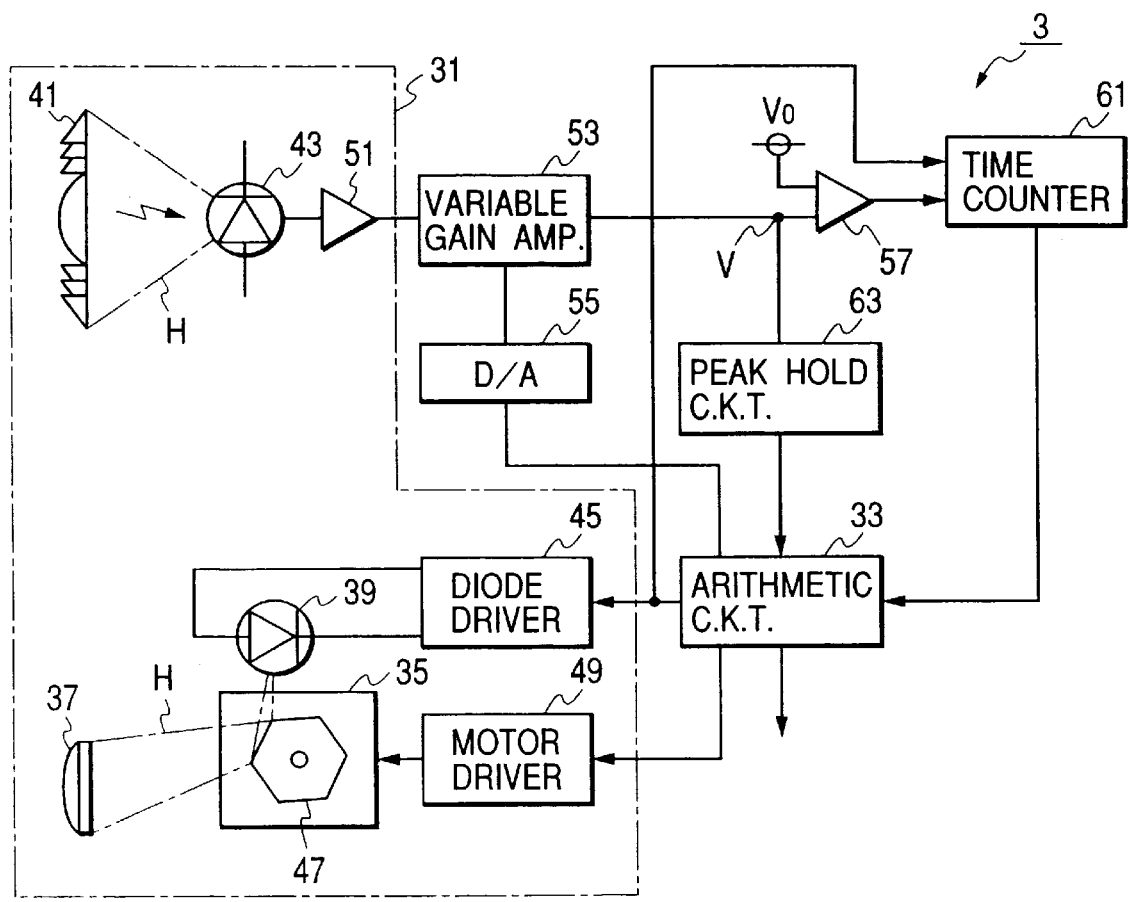
FIG. 2 is a circuit diagram which shows a distance/azimuth measuring scanner used in the automotive obstacle detecting system of FIG. 1.

The transceiver unit 31 includes, as shown in FIG. 2, a semiconductor laser diode 39 and a light sensitive element 43. The laser diode 39 emits laser beams H in the form of pulse signals at given angular intervals through a scanning mirror unit 35 and a light emission lens 37. The light sensitive element 43 receives the laser beam(s) H reflected from an obstacle(s) (not shown) within a radar detectable zone, and provides a voltage corresponding to the intensity of the received laser beam H. The transceiver unit 31 may alternatively use a radio wave or a supersonic wave instead of the laser beam.

The laser diode 39 is connected to the arithmetic circuit 33 through a diode driver 45, and emits laser beams H in response to a diode control signal from the arithmetic circuit 33. The scanning mirror unit 35 consists of a polygonal mirror 47 and an electric motor (not shown). The mirror 47 is rotatably supported by a vertically extending shaft, and is moved by the motor horizontally to have the laser beams H scan a frontal detection area over a given angle.

A voltage signal outputted from the light sensitive element 43 is amplified by a pre-amplifier 51 to a given level and then inputted to a variable gain amplifier 53. The variable gain amplifier 53 is connected to the arithmetic circuit 33 through a D/A converter 55, and amplifies an input voltage according to a gain provided by the arithmetic circuit 33 to output it to a comparator 57. The comparator 57 compares an output voltage V from the variable gain amplifier 53 with a given reference voltage level V0. If the voltage V exceeds the reference voltage V0 (V>V0), then the comparator 57 provides a preselected received light signal to a time counting circuit 61.

To the time counting circuit 61, the diode control signal supplied from the arithmetic circuit 33 to the diode driver 45 is also inputted. The time counting circuit 61 calculates a phase difference (i.e., an input time difference) between the received light signal and the diode control signal and provides a signal indicative thereof to the arithmetic circuit 33. The arithmetic circuit 33 determines the distance to and angular direction of the obstacle based on the phase difference and an angular position of the mirror 47. The output voltage V from the variable gain amplifier 53 is also inputted to the peak hold circuit 63. The peak hold circuit 63 provides a maximum of the output voltage V to the arithmetic circuit 33.

The time counting circuit 61 may be provided with an odd-stage ring oscillator in which an odd number of inverter gate delay circuits inverting input signal levels are connected in a ring form, and a pulse edge is circulated around the connected delay circuits. For example, IEICE TRANS. ELECTRON vol. E76-C. no. 12, pp. 1774–1779, published on December 1993 discloses a suitable ring gate delay circuit system.

The phase difference (i.e., the time difference) between the received light signal and the diode control signal may be determined in the manner as taught in U.S. Pat. No. 5,627,511 issued May 6, 1997, assigned to the same assignee of this application, disclosure of which is incorporated herein by reference.

After calculating the distance to and angular direction of the obstacle (hereinafter, also referred to two-dimensional distance data), the arithmetic circuit 33 outputs them to the control unit 5. The control unit 5 then performs programs, as shown in FIGS. 3 to 6, to determine the type of the obstacle and the ability to detect the obstacle.

Figure 3:
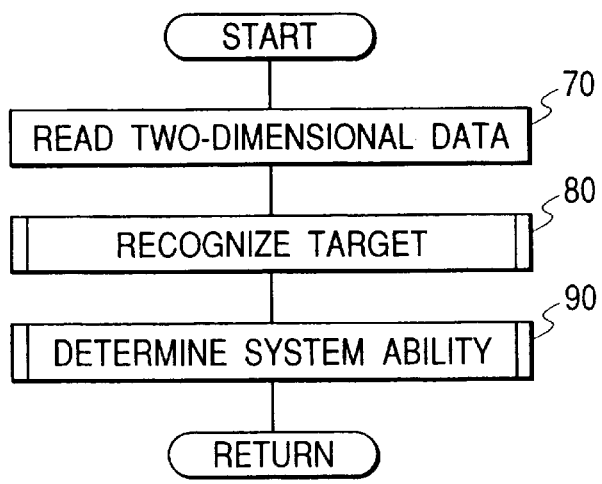
FIG. 3 is a flowchart of a main program performed by the automotive obstacle detecting system of FIG. 1.

FIG. 3 shows a main program logically performed by the control unit 5 at time intervals of 0.1 sec.

After entering the program, the routine proceeds to step 70 wherein the two-dimensional distance data provided by the arithmetic circuit 33 is read. The routine proceeds to step 80 wherein each obstacle tracked by the distance/azimuth measuring scanner 3 should be determined as a target or not. The routine proceeds to step 90 wherein it is determined whether the obstacle detecting system 1 has the ability to determine the distance to the target accurately or not, that is, whether the obstacle detecting system 1 is malfunctioning or not.

Figure 4:
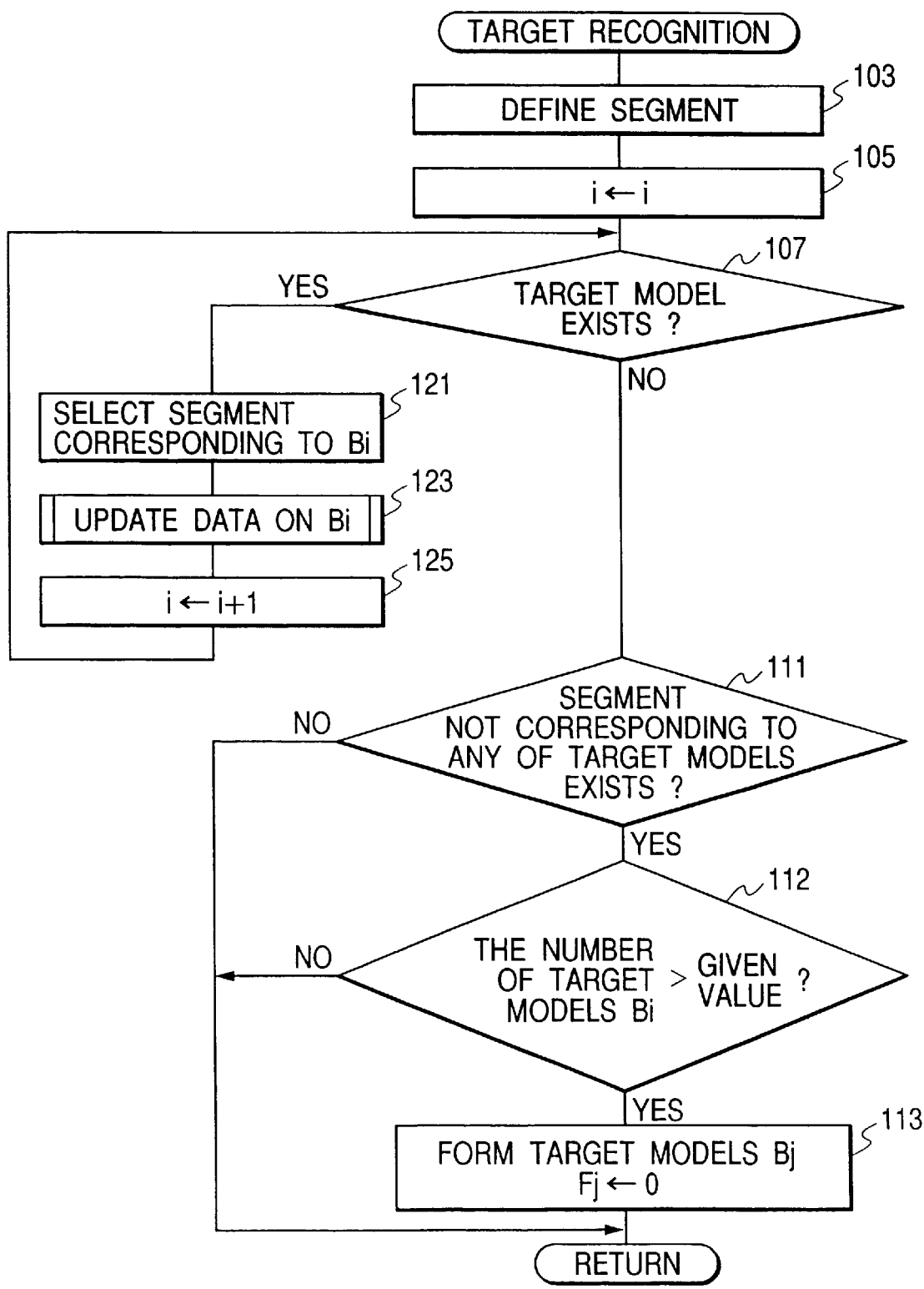
FIGS. 4 and 5 show a flowchart of a sub-program performed to recognize an obstacle acquired by the distance/azimuth measuring scanner of FIG. 2 as a given target.

FIG. 4 shows an operation in step 80 the details of which is taught in U.S. Pat. No. 5,574,463, issued Nov. 12, 1996, assigned to the same assignee of this application, disclosure of which is incorporated therein by reference.

In summary, in step 103, the obstacle tracked by the distance/azimuth measuring scanner 3 is plotted using discrete points on a rectangular coordinate plane defined by the x-axis extending in a width-wise direction of the system vehicle and the y-axis extending in the longitudinal center line of the system vehicle based on the two-dimensional distance data elements derived from the arithmetic circuit 33. From among these points, ones which are located adjacent each other in the x-axis direction at intervals shorter than a transmission cycle of the laser beams H and in the y-axis direction at intervals shorter than 3.0 m are collected into a group(s) and defined as a segment(s).

The routine proceeds to step 105 wherein a parameter i is set to one (1). The routine proceeds to step 107 wherein it is determined whether there are target models Bi or not (i=a natural number). The target models Bi are models formed for a given set of segments in a manner, as described later in detail. In the first program cycle, the target models Bi are not yet provided. The routine, thus, proceeds from step 107 to step 111.

In step 111, it is determined whether a segment is not corresponding to any of the target models Bi or not. Since in the first program cycle, the target models Bi are, as described above, not yet formed, all the segments defined in step 103 do not match any of the target models Bi. The routine, thus, proceeds to step 112 wherein it is determined whether the number of target models Bi is smaller than a given value or not that is an upper limit of the number of obstacles which will appear within a given angular range scanned by the laser beams H plus a margin. In the first program cycle, a YES answer is obtained. The routine, thus, proceeds to step 113 wherein target models Bj (j=a natural number) are provided one for each of the segments which do not match the target models Bi and which are closer to the system vehicle. When the total number of target models Bi reaches a given value, the formation of the target models Bi is stopped.

Each of the target models Bj has data on central coordinates (X, Y) determined in the current program cycle, width W, and relative speeds Vx and Vy in the x- and y-axis directions thereof, data on central coordinates (X, Y) thereof derived in eight previous program cycles, and a condition flag Fj. When each of the target models Bj is formed, the central coordinates (X, Y) are determined by central coordinates of the segment. The width W is determined by the length of the segment. The relative speed Vx in the x-axis direction is set to zero (Vx=0), while the relative speed Vy in the y-axis direction is set to -½ times the speed of the system vehicle. The data (i.e., the central coordinates (X, Y), the width W, and the relative speeds Vx and Vy) in eight previous program cycles are empty. The condition flag Fj is set to zero (Fj=0). The condition flag Fj indicates three different conditions of the target model Bj: unfixed, identified, and extrapolated conditions as will be discussed later in detail. Fj=0 indicates the unfixed condition which is met when the target model Bj is formed.

If a YES answer is obtained in step 107, then the routine proceeds to step 121 wherein ones matching the target models Bi are selected from the segments. The matching of the segments with the target models Bi and selection of the segments are taught in U.S. Pat. No. 5,574,463, as described above, and explanation thereof in detail will be omitted here.

The routine proceeds to step 123 wherein the target models Bi are updated in a manner, as described below. The routine proceeds to step 125 wherein the parameter i is incremented and returns back to step 107.

Figure 5:
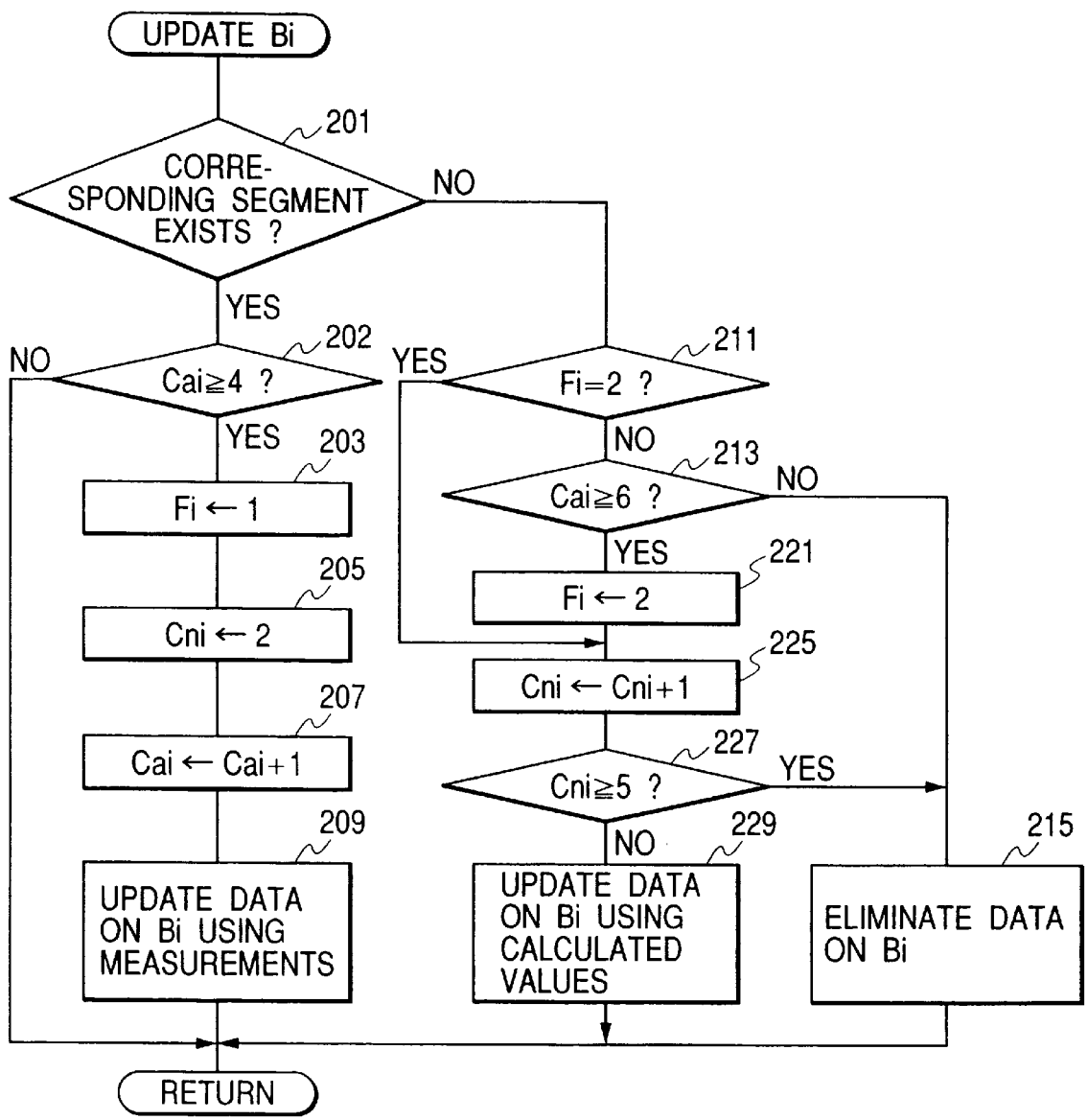

FIG. 5 shows a sub-program performed in step 123 of FIG. 4.

First, in step 201, it is determined whether ones corresponding or matching the target models Bi have been selected from the segments in step 121 of FIG. 4 or not. If a YES answer is obtained, then the routine proceeds to step 202 wherein it is determined whether a segment count value Cai is greater than or equal to four (4) or not. The segment count value Cai indicates the number of times the YES answer has been obtained in step 201. If a YES answer is obtained in step 202, then the routine proceeds to step 203 wherein a condition flag Fi is set to one (1) indicating that the target model Bi has been identified at a confidence level. Alternatively, if a NO answer is obtained, then the routine terminates.

After step 203, the routine proceeds to step 205 wherein a non-segment count value Cni is reset to zero (0) which indicates the number of times the NO answer has been obtained in step 201. The routine proceeds to step 207 wherein the segment count value Cai is incremented. The routine proceeds to step 209 wherein the data on the target models Bi are updated using data on the segments selected in step 201 and returns back to the main program.

The updating of data on the target model Bi will be discussed below in detail.

For each segment selected in step 201, the central coordinates and length (corresponding to the width of the target Bi), as described above, have already been determined. If the central coordinates and the length are defined as (Xs, Ys) and Ws, central coordinates and width of the target model Bi are newly determined as (Xs, Ys) and Ws, respectively. The relative speed (Vx, Vy) is newly determined in equation (1) below.

$$(Vx, Vy) = ((Xs-Xk)/dt, (Ys-Yk)/dt) \quad (1)$$

where Xk and Yk are central coordinates of the target model Bi that are ones derived, for example, eight program cycles earlier, and dt is the elapsed time from determination of those central coordinates.

If a NO answer is obtained in step 201, then the routine proceeds to step 211 wherein it is determined whether the condition flag Fi shows two (2) or not which indicates the extrapolated conditions. When the routine enters step 211 for the first time, the condition flag Fi is zero (0) or one (1). The routine, thus, proceeds to step 213 wherein it is determined whether the segment count value Cai is greater than or equal to six (6) or not. If a NO answer is obtained, then the routine proceeds to step 215 wherein all data on the target model Bi is cleared and returns back to the main program. Specifically, as long as one matching the target model Bi is selected from the segments, steps 202 to 209 are repeated, while when the matched segment is not selected continuously through six program cycles, that is, when the target model Bi has disappeared before the segment count value Cai reaches six, all data on the target model Bi is eliminated in step 215. This allows the data on the target model Bi corresponding to the segment which has been selected temporarily to be eliminated, thus eliminating unnecessary data on a roadside obstacle such as a guardrail or a road sign, which allows an obstacle such as a preceding vehicle (i.e., corresponding to the target model Bi) to be tracked accurately.

Alternatively, if a NO answer is obtained in step 213 (Cai<6) meaning that an obstacle (i.e., the target model Bi) has disappeared after being tracked through six or more program cycle cycles, the routine proceeds to step 221 wherein the condition flag Fi is set to two (2) which indicates that the target model Bi is being extrapolated.

The routine proceeds to step 225 wherein the non-segment count value Cni is incremented. The routine proceeds to step 227 wherein it is determined whether the non-segment count value Cni reaches five (5) or not. If a YES answer is obtained meaning that the track of the obstacle (i.e., the target model Bi) has been lost for a period of time of five or more program cycles, then the routine proceeds to step 215 wherein all the data on the target model Bi is cleared. Alternatively, if a NO answer is obtained, then the routine proceeds to step 229 wherein the data on the target model Bi is updated. Specifically, the central coordinates (X, Y) of the target model Bi are updated under condition that the relative speed (Vx, Vy) and the width W are not changed. This allows the obstacle (i.e., the target model Bi) to be tracked easily if it is acquired again after been tracked through six or more program cycles and lost.

Referring back to FIG. 4, when the data on all the target models Bi (i=1, 2, . . . ) are updated through a loop consisting of steps 107, 121, 123, and 125, it will cause any of the target models Bi not to correspond to the parameter i last incremented in step 125. Therefore, a NO answer is obtained in step 107, and the routine proceeds to step 111.

In step 111, it is determined whether there is a segment which does not match any of the target models Bi or not. If a NO answer is obtained, then the routine terminates. Alternatively, if a YES answer is obtained, then the routine proceeds to step 112 as described above.

As apparent from the above discussion, it is possible to determine whether an obstacle defined as a segment matches one of the target models Bi recognized previously or not with high accuracy. This allows the relative speed (Vx, Vy) of an obstacle corresponding to the target model Bi to the speed of the system vehicle to be determined accurately.

Figure 6:
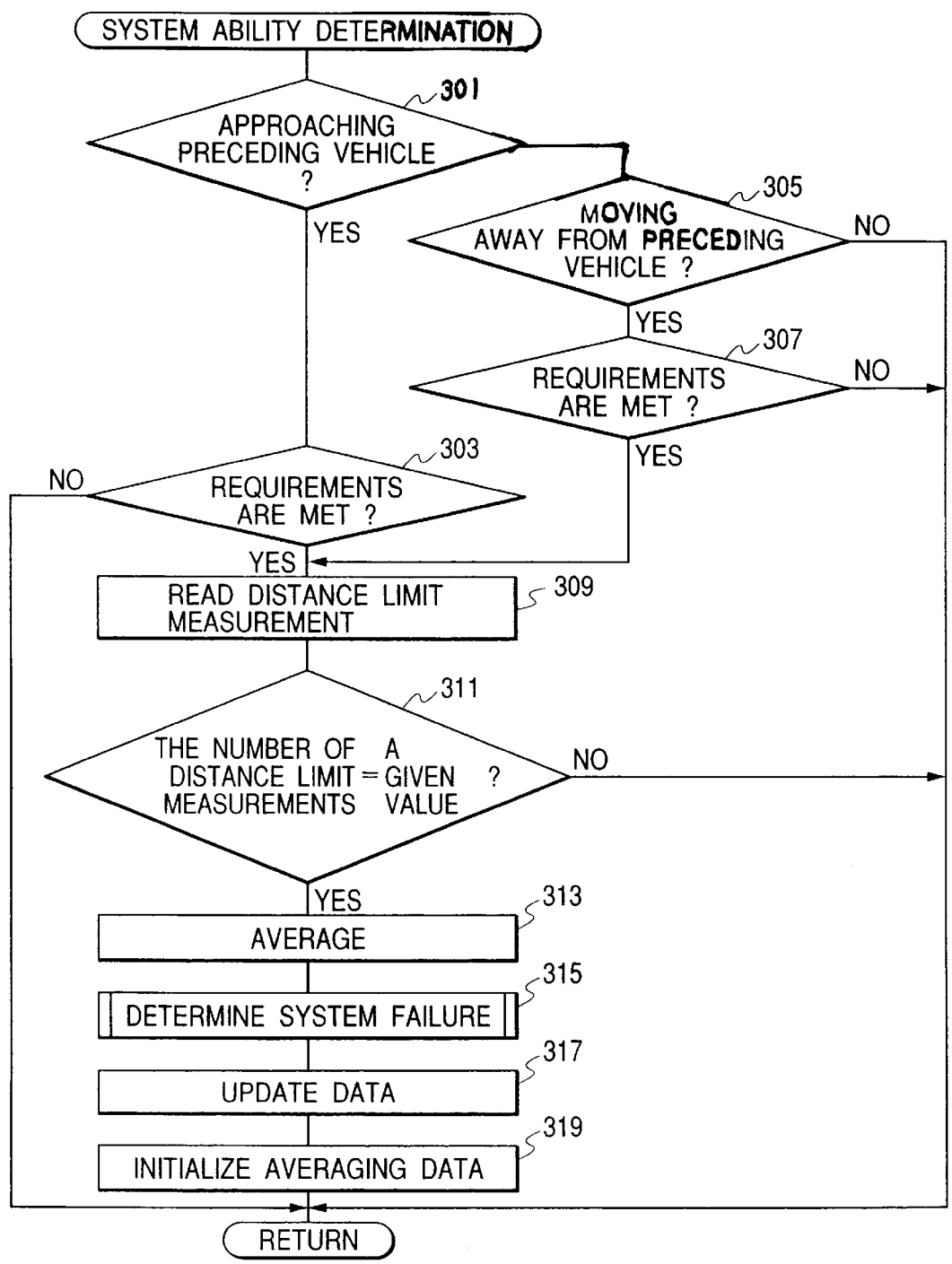
FIG. 6 shows a flowchart of a sub-program performed to determine a change in system ability to determine the distance to a target.

FIG. 6 shows an operation in step 90 of FIG. 3.

First, in step 301, it is determined whether the system vehicle is approaching a preceding vehicle or not. If a YES answer is obtained, then the routine proceeds to step 303. Alternatively, if a NO answer is obtained, then the routine proceeds to step 305.

The determination in step 301 is made when a target (i.e., a preceding vehicle) assumes the identified condition for the first time following the unfixed condition, that is, when at least 0.4 second or more have passed after the target is placed in the unfixed condition (for example, when the target continues to be acquired or detected through four cycles if 0.1 second is required for one cycle). Note that the unfixed condition is an unstable condition immediately after an obstacle is detected by the distance/azimuth measuring scanner 3, and the identified condition is a condition wherein the obstacle identified as a target at a high confidence level. In other words, a target such as a preceding vehicle is considered to have begun to be acquired by the radar of the system vehicle when the target has switched from the unfixed condition to the identified condition.

In step 303, it is determined whether five requirements (1) to (5), as discussed below, are met or not. More the requirements, the greater the accuracy in determining the system ability to measure the distance between the system vehicle and a preceding vehicle.

(1) the system vehicle is traveling straight

For example, when the radius of a turn of the system vehicle which is measured based on a steered angle of a steering wheel of the system vehicle monitored by the steering angle sensor 50 is greater 3000 m, it may be determined that the system vehicle is traveling straight. Alternatively, if it is determined that the system vehicle is traveling on a curved road, the routine terminates without performing the system ability determination. This is because when the system vehicle is traveling on a curved road, it will increase the possibility that the track of a preceding vehicle is lost, and another obstacle is determined as the preceding vehicle in error.

(2) the speed of the system vehicle is higher than 40 km

When the speed of the system vehicle is lower than or equal to 40 km, it may cause a shift between the radius of curvature of a road calculated based on the output from the steering angle sensor 50 and an actual radius of curvature of the road to be increased, or there is a high possibility that the road is congested, making it difficult to measure the distance to a preceding vehicle accurately when it begins to be acquired, that is, at a time when the preceding vehicle approaches the system vehicle and has entered the radar detectable zone. Thus, when the speed of the system vehicle is lower than or equal to 40 km, the routine terminates without performing the system ability determination. In the following discussion, the time when a preceding vehicle appears in front of the system vehicle and has entered the radar detectable zone will be referred to as the beginning of radar acquisition, and the time when the preceding vehicle moves away from the system vehicle and has reached a limit of the radar detectable zone will be referred to as the end of radar acquisition.

(3) the relative speed of the system vehicle to a preceding vehicle is higher than 5 km The relative speed of the system vehicle may be determined by the relative speed Vy of the preceding vehicle as described above.

When the relative speed is lower than or equal to 5 km, a change in distance to the preceding vehicle is small, thus making it difficult to measure the distance to the preceding vehicle at the beginning and end of radar acquisition of the preceding vehicle. Therefore, when the relative speed is lower than or equal to 5 km, the routine terminates without performing the system ability determination.

(4) the distance to a target is longer than 10 m

When the distance to the target is shorter than or equal to 10 m, there is a low possibility that a preceding vehicle is detected, while there is a high possibility that motes of dust floating in the air are recognized as an obstacle. Thus, when the distance to the target is shorter than or equal to 10 m, the routine terminates without performing the system ability determination.

(5) the system vehicle or a preceding vehicle has not changed lanes

For example, when two preceding vehicles A and B are, as shown in FIGS. 7(a) to 7(e), traveling ahead of the system vehicle, and when the preceding vehicle B is shifted to an adjacent lane, it may cause the distance to the preceding vehicle A to be determined in error as the distance measured at the beginning of radar acquisition.

Figure 7A:
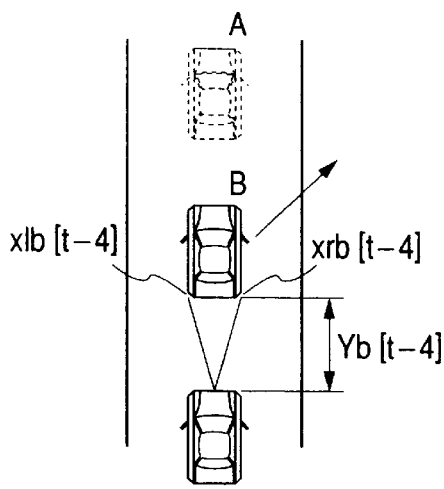
FIGS. 7(a), 7(b), 7(c), 7(d), and 7(e) illustrate positional relations among two preceding vehicles and a system vehicle from time t-4 to time t when one of the preceding vehicles has emerged from behind the other preceding vehicle.
Figure 7B:
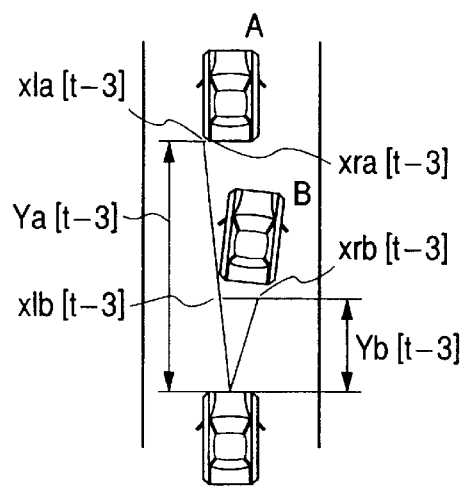
Figure 7C:
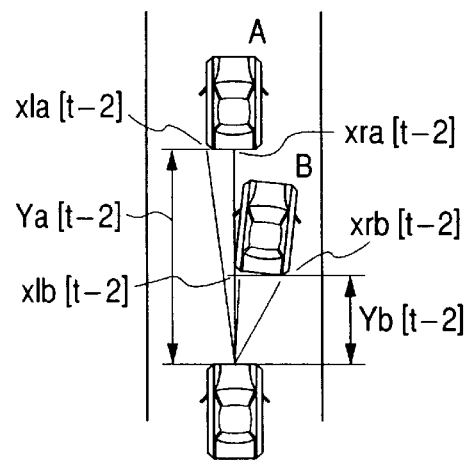
Figure 7D:
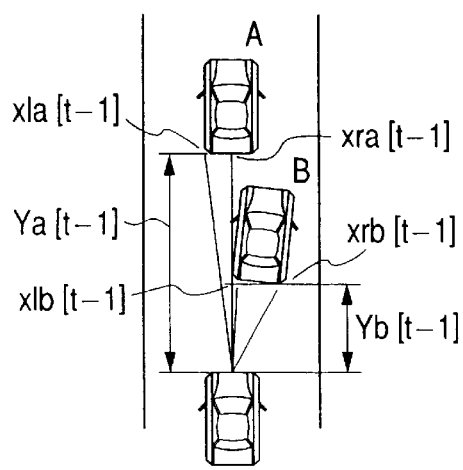
Figure 7E:
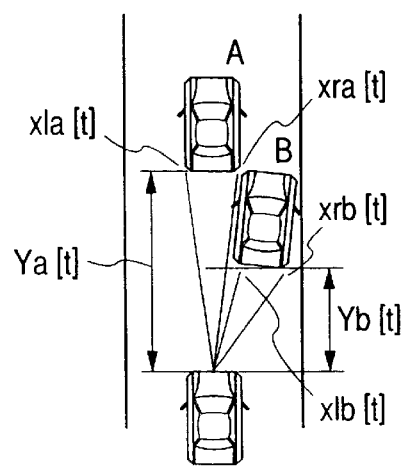

Specifically, in the case where the preceding vehicle B is, as shown in FIG. 7(e), closer to the system vehicle than the preceding vehicle A, and the preceding vehicle A is acquired at time [t] for the first time in the identified condition, if a target (i.e., the preceding vehicle B) meets requirements, as described below, it is determined that the preceding vehicle A has appeared out of a dead angle or space behind the preceding vehicle B, and the routine terminates without performing the system ability determination.

FIGS. 7(a) to 7(e) illustrate positional relations among the preceding vehicles A and B and the system vehicle from time [t−4] to [t]. Assume that the ECU 5 stores data elements, as listed below, through a maximum of eight program cycles.

Ya: the distance to the preceding vehicle A
Yb: the distance to the preceding vehicle B
xlb: coordinates of a left end of the preceding vehicle B
xrb: coordinates of a right end of the preceding vehicle B
xla: coordinates of a left end of the preceding vehicle A
xra: coordinates of a right end of the preceding vehicle A An overlap of relative position of the preceding vehicle A at time [t] with relative position of the preceding vehicle B indicated by the oldest data elements and an overlap of relative position of the preceding vehicle B at time [t] with relative position of the preceding vehicle A indicated by the oldest data elements are checked using relations, as listed below. If any of the following relations is met, then the routine terminates without performing the system ability determination.

xla [t]≦xlb [maxpast]≦xra [t]
xla [t]≦xrb [maxpast]≦xra [t]
xlb [t]≦xla [maxpast]≦xrb [t]
xlb [t]≦xra [maxpast]≦xrb [t]

where maxpast indicates the oldest data element.

If at least one of the above relations is met, it means that the preceding vehicles A and B traveled in the same direction while overlapping with each other as viewed from the system vehicle, after which the preceding vehicle B moved to an adjacent lane, so that the preceding vehicle A is now acquired by the system vehicle in the identified condition. In this case, the routine, as described above, terminates without performing the system ability determination.

Referring back to FIG. 6, if a NO answer is obtained in step 301, the routine proceeds to step 305 wherein it is determined whether the system vehicle is moving away from the preceding vehicle or not. If a NO answer is obtained, then the routine terminates. Alternatively, if a YES answer is obtained, then the routine proceeds to step 307.

The determination in step 305 is made by determining whether a target (i.e., a preceding vehicle) has assumed the extrapolated condition for the first time following the identified condition or not and whether the relation (2) below is satisfied or not. Note that the extrapolated condition represents the status of a target immediately after it becomes impossible to detect the target following the identified condition.

$$\text{detected duration of a preceding vehicle} > a \times (\text{distance to the preceding vehicle at the end of the radar acquisition/relative speed in a traveling direction}) \quad (2)$$

where a=0.5 that is an experimental value.

The use of the above relation (2) enables determination of whether it has become impossible to detect the preceding vehicle or not as a result of movement of the preceding vehicle away from the system vehicle, that is, whether the end of radar acquisition has been reached or not.

Figure 10:
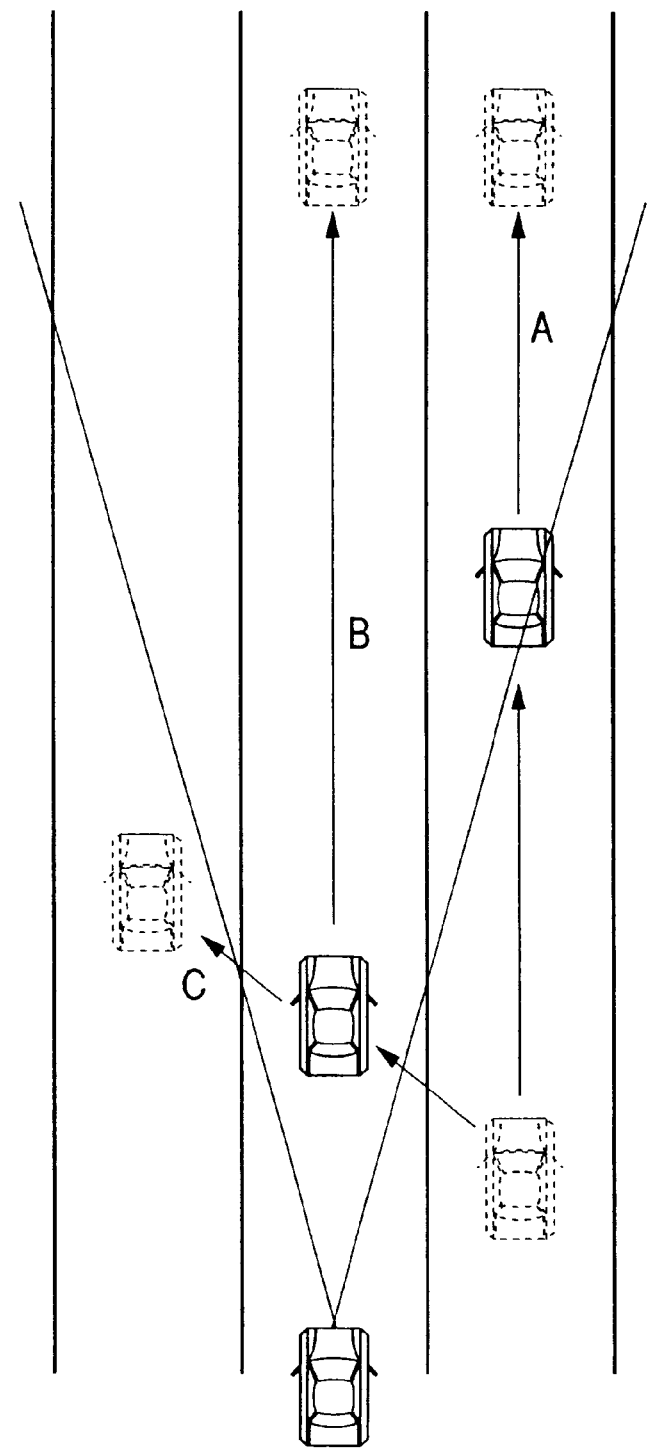
FIG. 10 is an illustration which shows three different traveling patterns of a preceding vehicle.

For example, of three traveling patterns A, B, and C of a preceding vehicle, as shown in FIG. 10, the traveling patterns A and B allow the distance to the preceding vehicle to be measured accurately at the end of radar acquisition, while the traveling pattern C hardly satisfy the relation (2) because the preceding vehicle traverses the radar detectable zone.

Therefore, when the target has assumed the extrapolated condition for the first time following the identified condition, and the relation (2) is satisfied, it is determined that the target has reached the end of radar acquisition. Alternatively, if not, the routine terminates without performing the system ability determination.

In step 307, it is determined whether five requirements (1) to (5), as discussed below, are met or not. More the requirements, the greater the accuracy in determining the system ability to measure the distance between the system vehicle and a preceding vehicle.

(1) the system vehicle is traveling straight

The system ability determination is prohibited when the system vehicle is traveling on a curved road having a radius of 3000 m or less.

(2) the speed of the system vehicle is higher than 40 km

When the speed of the system vehicle is lower than or equal to 40 km, the routine terminates without performing the system ability determination.

(3) the relative speed of the system vehicle to a preceding vehicle is higher than 5 km When the relative speed is lower than or equal to 5 km, the routine terminates without performing the system ability determination.

(4) the distance to a target is longer than 10 m

When the distance to the target is shorter than or equal to 10 m, the routine terminates without performing the system ability determination.

(5) no vehicle has cut in front of the system vehicle (i.e., the target is out of a dead angle)

For example, when a preceding vehicle B, as shown in FIGS. 8(a) to 8(e), has entered between a preceding vehicle A and the system vehicle, it may cause the distance to the preceding vehicle A to be determined in error as the distance measured at the end of radar acquisition although the preceding vehicle A is within the radar detectable zone. In this case, the routine terminates without performing the system ability determination.

Figure 8A:
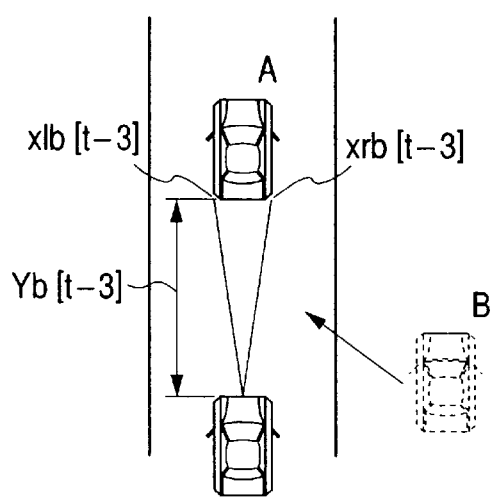
FIGS. 8(a), 8(b), 8(c), and 8(d) illustrate positional relations among two preceding vehicles and a system vehicle from time t-3 to time t when one of the preceding vehicles has cut in front of the system vehicle.
Figure 8B:
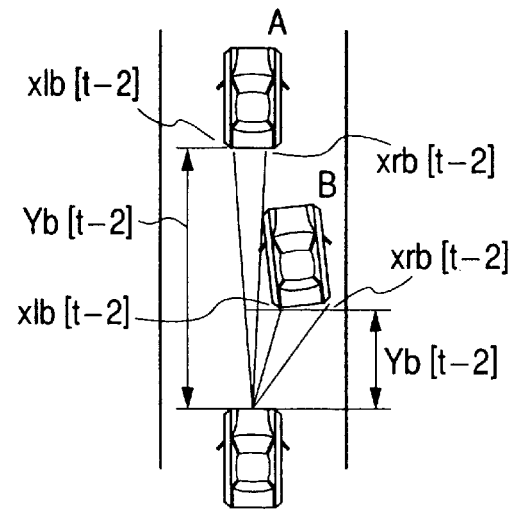
Figure 8C:
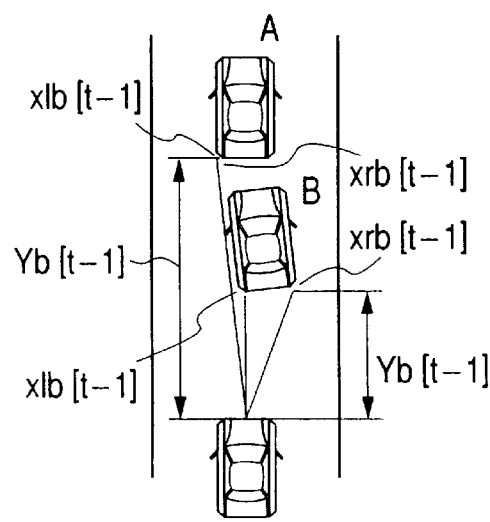
Figure 8D:
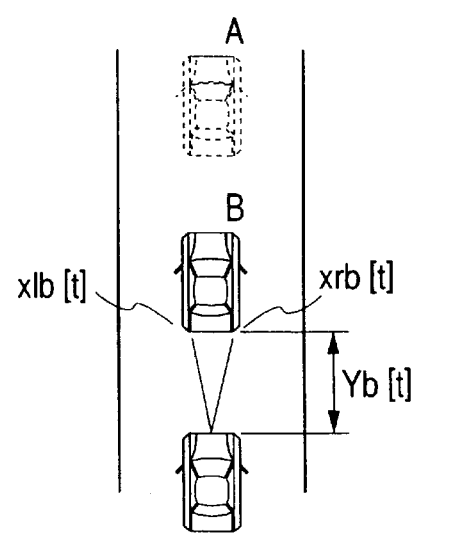

Specifically, in the case where the preceding vehicle A is brought the extrapolated condition for the first time at time [t] in FIG. 8(d), and the preceding vehicle is traveling closer to the system vehicle than the preceding vehicle A, if any of requirements, as described below, is met, then it is determined that the preceding vehicle A has entered a dead angle or space behind the preceding vehicle B, and the routine terminates without performing the system ability determination.

FIGS. 8(a) to 8(d) illustrate positional relations among the preceding vehicles A and B and the system vehicle from time [t−3] to [t]. Assume that the ECU 5 stores data elements, as listed below, through a maximum of eight program cycles.

Ya: the distance to the preceding vehicle A
Yb: the distance to the preceding vehicle B
xlb: coordinates of a left end of the preceding vehicle B
xrb: coordinates of a right end of the preceding vehicle B
xla: coordinates of a left end of the preceding vehicle A
xra: coordinates of a right end of the preceding vehicle A An overlap of relative position of the preceding vehicle A indicated by the oldest data element with relative position of the preceding vehicle B at time [t] is checked using relations, as listed below. If any of the following relations is met, then the routine terminates without performing the system ability determination.

xlb [t]≦xla [maxpast]≦xrb [t]
xlb [t]≦xra [maxpast]≦xrb [t]
xla [maxpast]≦xlb [t]≦xra [maxpast]
xla [maxpast]≦xrb [t]≦xra [maxpast]

where maxpast indicates the oldest data element.

If at least one of the above relations is met, it means that the preceding vehicle B is now tracked in an area where the preceding vehicle A was tracked previously. In this case, it is determined that the track of the preceding vehicle A has been lost as a result of cutting of the preceding vehicle B in front of the system vehicle, and the routine terminates without performing the system ability determination.

Referring back to FIG. 6, if a YES answer is obtained in either of steps 303 and 307, then the routine proceeds to step 309 wherein the distance to the target (i.e., the preceding vehicle) measured by the distance/azimuth measuring scanner 3 immediately when the target has reached the limit of the radar detectable zone, which will be referred to below as a distance limit measurement, is read.

The routine proceeds to step 311 wherein it is determined whether the distance limit measurement has been derived n times (e.g., n=10 times) in step 309 or not, that is, whether the number of distance limit measurements has reached n or not. If a No answer is obtained, then the routine returns back to the initial step. Alternatively, if a YES answer is obtained, then the routine proceeds to step 313 wherein the distance limit measurements derived thus far are averaged for minimizing an error.

The routine proceeds to step 315 wherein a determination of whether a system failure is occurring or not is made in a manner as described later in detail.

The routine proceeds to step 317 wherein data elements are updated. In practice, the distance limit measurement derived in this program cycle is stored in a memory location wherein the distance limit measurement derived one program cycle earlier has been stored so far for deriving a distance limit measurement in a subsequent program cycle. Specifically, the data elements are shifted in time sequence in memory locations.

The routine proceeds to step 319 wherein the data elements used in the averaging operation in step 313 is initialized.

Specifically, memory areas for storing the distance limit measurements used in the averaging operation and a count value indicating the number of the distance limit measurements are reset.

Figure 9:
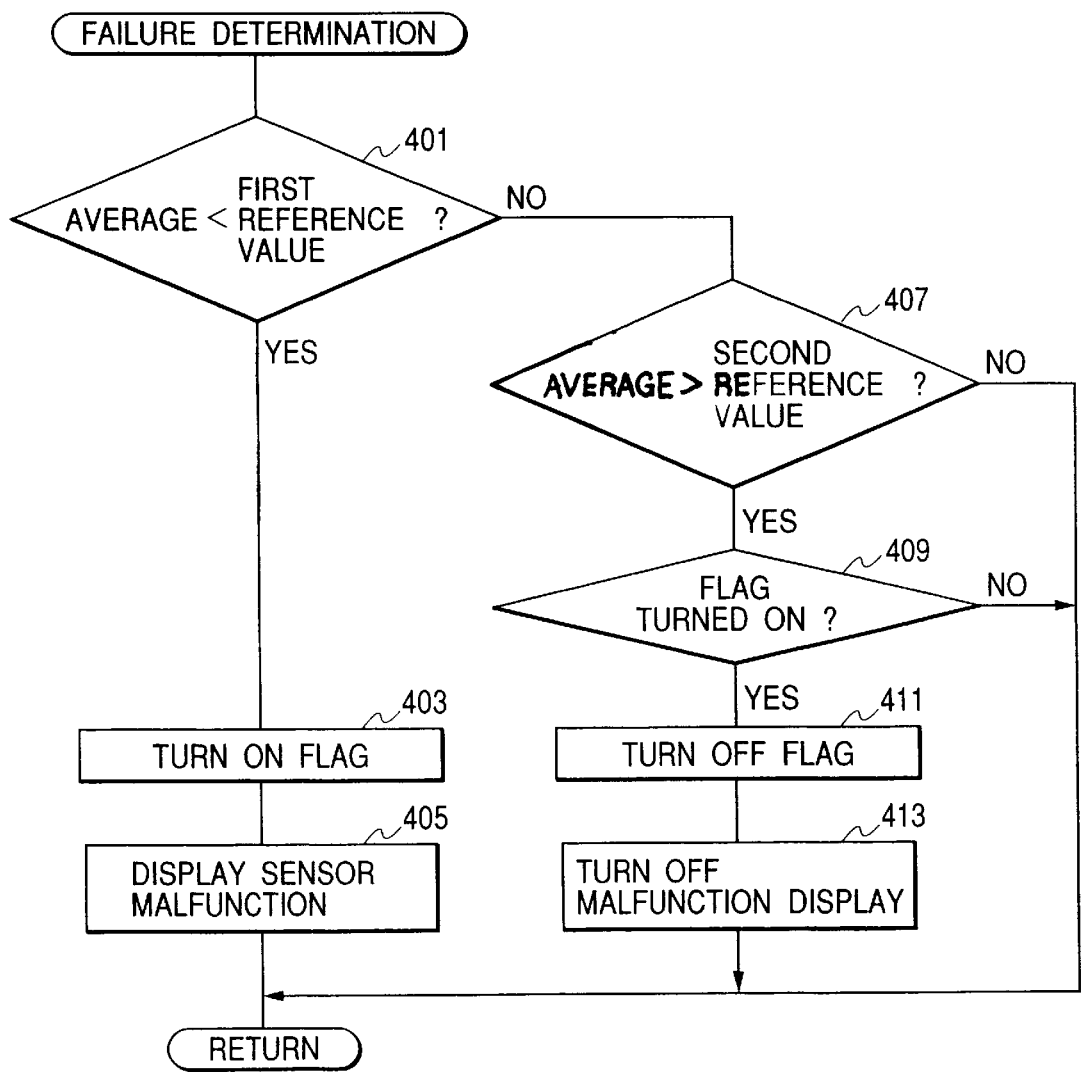
FIG. 9 shows a flowchart of a sub-program performed in step 315 of FIG. 6 to determine a system failure.

FIG. 9 is a flowchart of a sub-program performed in step 315 of FIG. 6 to determine whether the ability to measure the distance to a preceding vehicle has been decreased or not based on the averaged value of the distance limit calculated in step 313. The system ability determination, as will be apparent from the following discussion, is made separately at the beginning and end of radar acquisition.

First, in step 401, it is determined whether the averaged value derived in step 313 is smaller than a first reference value or not (e.g., 60 m that is a reference limit distance measurable by the system in a normal operating condition plus a given margin), that is, whether the system ability has been decreased or not. If a YES answer is obtained meaning that the system ability has been decreased, then the routine proceeds to step 403 wherein a sensor malfunction flag is turned on. The sensor malfunction flag is provided as an acquisition start sensor malfunction flag when the distance limit measurement is a value measured at the beginning of radar acquisition and as an acquisition end sensor malfunction flag when the distance limit measurement is a value measured at the end of radar acquisition.

The routine proceeds to step 405 wherein a malfunction signal is outputted to turn on the sensor malfunction display 29 to inform the vehicle operator of a malfunction of the distance/azimuth measuring scanner 3.

If a NO answer is obtained in step 410, then the routine proceeds to step 407 wherein it is determined whether the averaged value derived in step 313 is greater than a second reference value (e.g., 70 m) or not. This determination is made for checking whether the system ability has recovered or not. The hysteresis is provided between the first and second reference values in order to avoid the chattering.

If a NO answer is obtained in step 407 meaning that the system ability is not yet recovered, then the routine terminates while keeping the sensor malfunction flag as is. Alternatively, if a YES answer is obtained, then the routine proceeds to step 409 wherein it is determined whether the sensor malfunction flag is turned on or not. If a NO answer is obtained, then the routine terminates. Alternatively, if a YES answer is obtained, then the routine proceeds to step 411 wherein the sensor malfunction flag is turned off. The routine proceeds to step 413 wherein a malfunction off signal is outputted to turn off the sensor malfunction display 29 to inform the vehicle operator that the ability of the distance/azimuth measuring scanner 3 has been recovered.

The automotive obstacle detecting system 1 according to the second embodiment of the invention will be discussed below which is different from the first embodiment only in the system ability determination. Other arrangements are identical, and explanation thereof in detail will be omitted here.

The system ability determination of this embodiment is made using the distances to a preceding vehicle and a roadside obstacle. Note that if the target model Bi has been lost within six program cycles, as in step 213 of FIG. 5, and data on the target Bi has been eliminated, it may make it difficult to detect a roadside obstacle at confidence levels. In this case, it is advisable that the reference value (i.e., 6) for the segment count value Cai in step 213 be changed to, for example, five or less.

Figure 11:
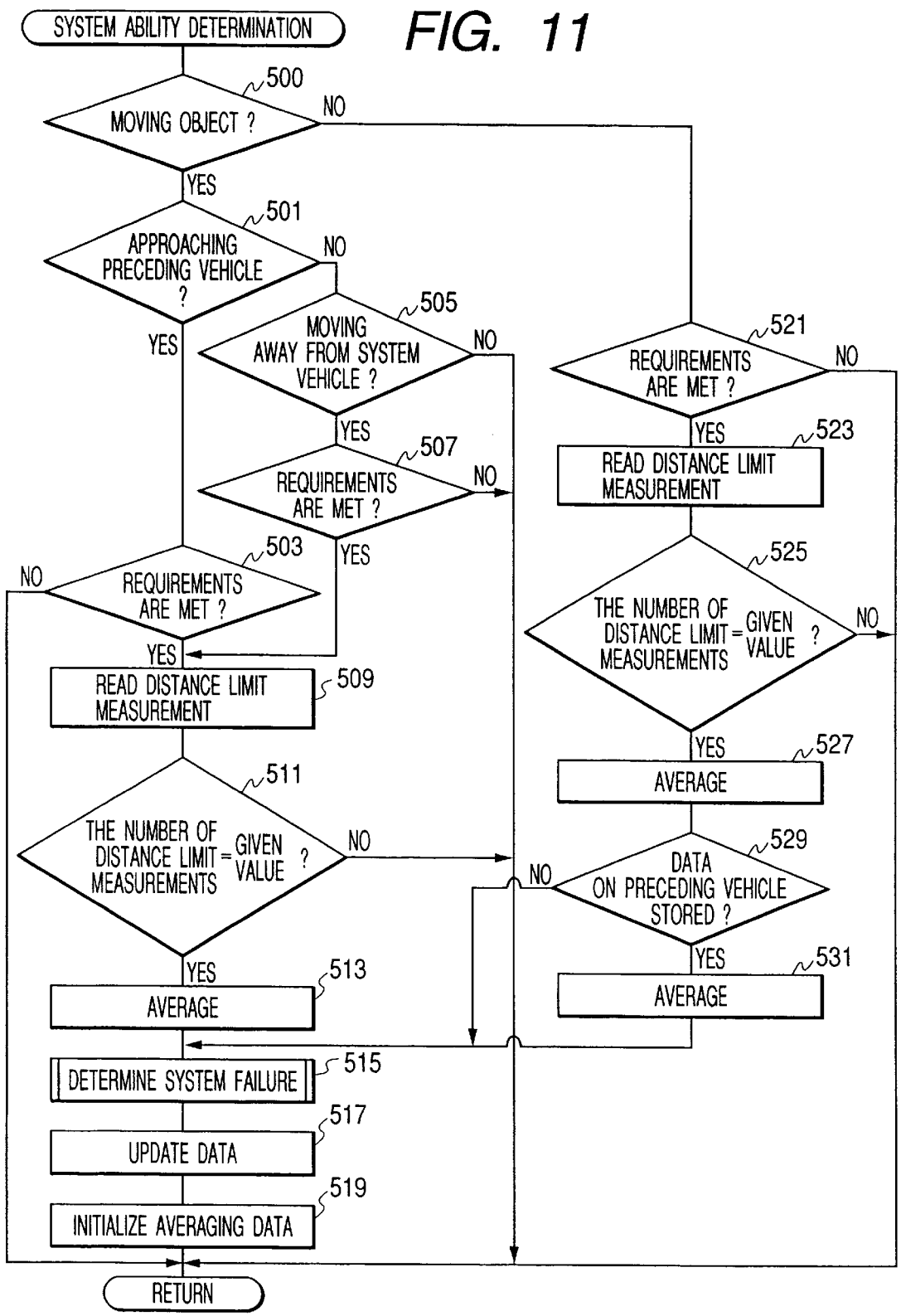
FIG. 11 shows a flowchart of a sub-program performed to determine a change in system ability to determine the distance to a target according to the second embodiment.

FIG. 11 shows a flowchart of a program of the second embodiment performed in step 90 of FIG. 3.

First, in step 500, it is determined whether an obstacle tracked by the distance/azimuth measuring scanner 3 is a moving object (i.e., a preceding vehicle) or not. For example, it is determined that either of the following relations is satisfied or not.

−Vy>speed of the system vehicle×0.7
Vy+speed of the system vehicle>20 km/h

If either of the above relations is satisfied, then it is concluded that the tracked obstacle is a stationary object such as a roadside obstacle, and the routine proceeds to step 521. Alternatively, if both the above relations are not satisfied, then it is concluded that the tracked obstacle is a preceding vehicle, and the routine proceeds to step 501. Note that if a tracked obstacle as determined as a stationary object previously satisfies either of the above relations, it may be recognized as a moving object.

Step 501 and later steps are identical with steps 310 to 319 in FIG. 6.

In brief, in step 501, it is determined whether the system vehicle is approaching a preceding vehicle or not. If a YES answer is obtained, then the routine proceeds to step 503. Alternatively, if a NO answer is obtained, then the routine proceeds to step 505.

In step 503, it is determined whether the five requirements (1) to (5), as discussed above in step 303, are met or not. If a YES answer is obtained, then the routine proceeds to step 509. Alternatively, if a NO answer is obtained, then the routine terminates.

In step 505, it is determined whether the system vehicle is moving away from the preceding vehicle or not. If a NO answer is obtained, then the routine terminates. Alternatively, if a YES answer is obtained, then the routine proceeds to step 507.

In step 507, it is determined whether the five requirements (1) to (5), as discussed above in step 303, are met or not. If a YES answer is obtained, then the routine proceeds to step 509. Alternatively, if a NO answer is obtained, then the routine terminates.

In step 509, the distance limit measurement is determined similar to step 309. The routine proceeds to step 511 wherein it is determined whether the distance limit measurement has been derived n times (e.g., n=10 times) in step 509 or not. If a No answer is obtained, then the routine returns back to the initial step. Alternatively, if a YES answer is obtained, then the routine proceeds to step 513 wherein the distance limit measurements derived thus far are averaged.

The routine proceeds to step 515 to determine whether the ability to measure the distance to a target has been decreased or not according to the sub-program shown in FIG. 9. The routine proceeds to step 517 wherein data elements are updated similar to step 317. The routine proceeds to step 519 wherein data elements used in the averaging operation in step 513 are initialized similar to step 319.

If a NO answer is obtained in step 500, then the routine proceeds to step 521 wherein it is determined whether five requirements (1) to (5), as listed below, are met or not. The following requirements (1) to (5) are different from the requirements (1) to (5) used in steps 303 and 503 only in that the target is a roadside obstacle instead of the preceding vehicle.

(1) the system vehicle is traveling straight
(2) the speed of the system vehicle is higher than 40 km
(3) the relative speed of the system vehicle to the roadside obstacle is higher than 5 km
(4) the distance to the roadside obstacle is longer than 10 m
(5) the system vehicle or a preceding vehicle has not changed lanes (i.e., the roadside obstacle does not enter a dead angle)

For example, in the case where it is impossible to detect a roadside obstacle within the radar detectable zone because it is hiding behind a preceding vehicle, when the preceding vehicle has moved from the same lane as the system vehicle to adjacent one or the system vehicle has moved to the adjacent lane, it will cause the distance to the roadside obstacle emerging from behind the preceding vehicle to be measured in error as the distance measured at the beginning of radar acquisition. Thus, in this case, the routine terminates without performing the system ability determination.

If the above five requirements are all met, then the routine proceeds to step 523 wherein the distance limit measurement is determined similar to step 509. The routine proceeds to step 525 wherein it is determined whether the distance limit measurement has been derived n times (e.g., n=10 times) or not. If a NO answer is obtained, then the routine returns back to the initial step. Alternatively, if a YES answer is obtained, then the routine proceeds to step 527 wherein the distance limit measurements derived thus far are averaged.

The routine proceeds to step 529 wherein it is determined whether the distance limit measurements of the preceding vehicle derived in step 509 are stored or not or whether the averaged value derived in step 511 is stored or not. If a NO answer is obtained, then the routine proceeds to step 515 to determine whether the ability to measure the distance to a target has been decreased or not according to the sub-program shown in FIG. 9 using the averaged value of the distance limit measurements calculated in step 527. Alternatively, if a YES answer is obtained, then the routine proceeds to step 531 wherein the averaged values derived in steps 513 and 527 are averaged according to the following equation (3).

$$\text{averaged value} = \text{the averaged value in step } 513 \times (1-\alpha) + \text{the averaged value in step } 527 \times \alpha \qquad (3)$$

where $\alpha$ is less than 0.5 because distance data on the preceding vehicle may be considered to have a higher accuracy.

The routine proceeds to step 515 to determine whether the ability to measure the distance to a target has been decreased or not according to the sub-program shown in FIG. 9 using the averaged value calculated in step 531.

The automotive obstacle detecting system 1 according to the third embodiment of the invention will be discussed below which is different from the first embodiment only in the system ability determination. Other arrangements are identical, and explanation thereof in detail will be omitted here.

The system ability determination of this embodiment is made using only the distance to a roadside obstacle.

Figure 12:
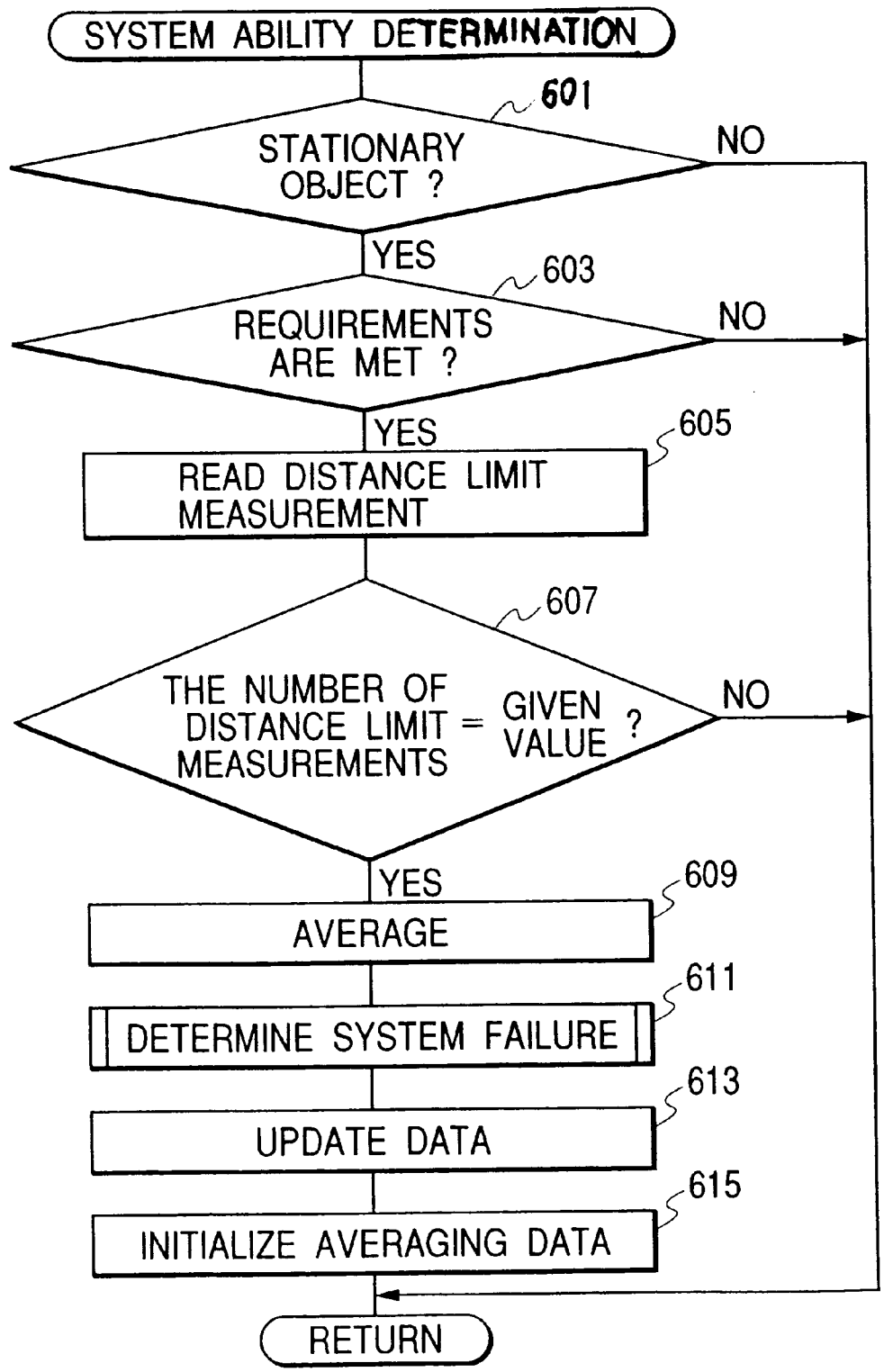
FIG. 12 shows a flowchart of a sub-program performed to determine a change in system ability to determine the distance to a target according to the third embodiment.

FIG. 12 shows a flowchart of a program of the third embodiment performed in step 90 of FIG. 3.

First, in step 601, it is determined whether an obstacle tracked by the distance/azimuth measuring scanner 3 is a stationary object (i.e., a roadside obstacle) or not. For example, it is determined that either of the following relations is satisfied or not.

−Vy>speed of the system vehicle×0.7
Vy+speed of the system vehicle>20 km/h

If either of the above is satisfied, then it is concluded that the tracked obstacle is a stationary object such as a roadside obstacle, and the routine proceeds to step 603. Alternatively, if both the above relations are not satisfied, then the routine terminates.

In step 603, it is determined whether five requirements (1) to (5), as listed below, which are the same as those used in step 521 are met or not.

(1) the system vehicle is traveling straight
(2) the speed of the system vehicle is higher than 40 km
(3) the relative speed of the system vehicle to the roadside obstacle is higher than 5 km
(4) the distance to the roadside obstacle is longer than 10 m
(5) the system vehicle or a preceding vehicle has not changed lanes (i.e., the roadside obstacle does not enter a dead angle)

If the above five requirements are all met, then the routine proceeds to step 605 wherein the distance limit measurement is determined similar to step 523.

The routine proceeds to step 607 wherein it is determined whether the distance limit measurement has been derived n times (e.g., n=10 times) or not. If a NO answer is obtained, then the routine returns back to the initial step. Alternatively, if a YES answer is obtained, then the routine proceeds to step 609 wherein the distance limit measurements derived thus far are averaged.

The routine proceeds to step 611 to determine whether the ability to measure the distance to a target has been decreased or not according to the sub-program shown in FIG. 9 using the averaged value calculated in step 609. The routine proceeds to step 613 wherein data elements are updated similar to step 317. The routine proceeds to step 615 wherein data elements used in the averaging operation in step 609 are initialized similar to step 319.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the determination of whether the ability to measure the distance to a target has been decreased or not in the sub-program of FIG. 9 may alternatively be made by mounting the distance/azimuth measuring scanner 3 backward of the system vehicle to measure the distance to a trailing vehicle or a roadside obstacle present at the rear of the system vehicle.

When the trailing vehicle is approaching the system vehicle, the distance to the trailing vehicle measured at the beginning of radar acquisition may be used as the distance limit measurement, while when the trailing vehicle or the roadside obstacle is leaving the system vehicle, the distance to the trailing vehicle or the roadside obstacle measured at the end of radar acquisition may be used as the distance limit measurement.

The determination of whether an obstacle tracked by the distance/azimuth measuring scanner 3 is a moving object or not in steps 500 and 601 may alternatively be made in the following manner.

First, the distance Ad to an obstacle measured by the distance/azimuth measuring scanner 3 is divided by the infinitesimal time At (e.g., 100 msec.) to determine the relative speed Vr (=Δd/Δt). An absolute value of the relative speed Vr is compared with an absolute value of the speed of the system vehicle. If the relative speed Vr is nearly equal in absolute value to the speed of the system vehicle, the obstacle is recognized as a stationary object such as a roadside obstacle. Alternatively, if the relative speed Vr is different in absolute value from the speed of the system vehicle, the obstacle is recognized as a moving object such as a preceding vehicle. As the relative speed Vr, a relative speed Vy in the Y-axis direction (i.e., the longitudinal direction of the system vehicle) may be used.

The distance/azimuth measuring scanner 3 may be replaced with a radar using a microwave or a supersonic wave.

What is claimed is:

1. An automotive obstacle detecting system comprising:
   a radar unit that transmits radar signals from a system vehicle equipped with the system and receives radar signals reflected by an obstacle present in an obstacle detectable zone;
   distance determining means for determining, based on the transmitted and the reflected signals, a distance between the system vehicle and the obstacle;
   distance limit determining means for determining a distance limit measurable by said distance measuring means; and
   system ability determining means for determining a change in ability to measure the distance to the obstacle by comparing the distance limit determined by said distance limit determining means with a given reference value, wherein when the obstacle acquired by said radar unit is a preceding vehicle and the system vehicle is approaching the preceding vehicle, said distance limit determining means determines the distance limit to be the distance to the preceding vehicle determined by said distance determining means immediately when the preceding vehicle has entered the obstacle detectable zone.

2. An automotive obstacle detecting system as set forth in claim 1, wherein said system ability determining means includes a means for determining the change in ability to measure the distance to the obstacle when the system vehicle is traveling straight.

3. An automotive obstacle detecting system as set forth in claim 2, wherein said system ability determining means includes a means for determining the change in ability to measure the distance to the obstacle when the system vehicle is traveling at a speed greater than a given value.

4. An automotive obstacle detecting system as set forth in claim 2, wherein said system ability determining means includes a means for determining the change in ability to measure the distance to the obstacle when a relative speed of the system vehicle to a preceding vehicle acquired by said radar unit as the obstacle is greater than a preselected value.

5. An automotive obstacle detecting system as set forth in claim 2, wherein said system ability determining means includes a means for determining the change in ability to measure the distance to the obstacle when the obstacle has not entered a dead angle behind another obstacle before a preselected period of time.

6. An automotive obstacle detecting system as set forth in claim 1, wherein said system ability determining means includes a means for determining the change in ability to measure the distance to the obstacle when the system vehicle is traveling at a speed greater than a given value.

7. An automotive obstacle detecting system as set forth in claim 1, wherein said system ability determining means includes a means for determining the change in ability to measure the distance to the obstacle when a relative speed of the system vehicle to a preceding vehicle acquired by said radar unit as the obstacle is greater than a preselected value.

8. An automotive obstacle detecting system as set forth in claim 1, wherein said system ability determining means includes a means for determining the change in ability to measure the distance to the obstacle when the obstacle has not entered a dead angle behind another obstacle before a preselected period of time.

9. An automotive obstacle detecting system comprising:
   a radar unit that transmits radar signals from a system vehicle equipped with the system and receives radar signals reflected by an obstacle present in an obstacle detectable zone;
   distance determining means for determining, based on the transmitted and the reflected signals, a distance between the system vehicle and the obstacle;
   distance limit determining means for determining a distance limit measurable by said distance measuring means; and
   system ability determining means for determining a change in ability to measure the distance to the obstacle by comparing the distance limit determined by said distance limit determining means with a given reference value, wherein when the obstacle acquired by said radar unit is a preceding vehicle and the system vehicle is moving away from the preceding vehicle, said distance limit determining means determines the distance limit to be the distance to the preceding vehicle determined by said distance determining means immediately when the preceding vehicle has reached a limit of the obstacle detectable zone.

10. An automotive obstacle detecting system comprising:
   a radar unit that transmits radar signals from a system vehicle equipped with the system and receives radar signals reflected by an obstacle present in an obstacle detectable zone;
   distance determining means for determining, based on the transmitted and the reflected signals, a distance between the system vehicle and the obstacle;

distance limit determining means for determining a distance limit measurable by said distance measuring means; and system ability determining means for determining a change in ability to measure the distance to the obstacle by comparing the distance limit determined by said distance limit determining means with a given reference value, wherein when no preceding vehicle is traveling ahead of the system vehicle, said distance limit determining means determines the distance limit to be the distance to a roadside obstacle determined by said distance determining means immediately when the roadside obstacle has entered the obstacle detectable zone.

* * * * *